(12) United States Patent
Fagans

(10) Patent No.: US 10,546,013 B2
(45) Date of Patent: Jan. 28, 2020

(54) FILE MANAGEMENT SYSTEM FACILITATING THE ORGANIZATION OF CONTENT BY USING VISUALIZATIONS OF THE ORGANIZATIONAL STATE AUGMENTED BY A CONFIGURABLE WORKFLOW

(71) Applicant: Joshua Fagans, Redwood City, CA (US)

(72) Inventor: Joshua Fagans, Redwood City, CA (US)

( * ) Notice: Subject to any disclaimer, the term of this patent is extended or adjusted under 35 U.S.C. 154(b) by 99 days.

(21) Appl. No.: 15/653,516

(22) Filed: Jul. 18, 2017

(65) Prior Publication Data

US 2018/0018351 A1 Jan. 18, 2018

Related U.S. Application Data

(60) Provisional application No. 62/363,827, filed on Jul. 18, 2016.

(51) Int. Cl.
*G06K 9/00* (2006.01)
*G06F 16/54* (2019.01)
*G06Q 10/10* (2012.01)
*G06F 16/50* (2019.01)

(52) U.S. Cl.
CPC .............. *G06F 16/54* (2019.01); *G06F 16/50* (2019.01); *G06Q 10/10* (2013.01)

(58) Field of Classification Search
None
See application file for complete search history.

(56) References Cited

U.S. PATENT DOCUMENTS

| | | | |
|---|---|---|---|
| 8,452,751 B2* | 5/2013 | Arrouye | G06F 16/00 707/707 |
| 9,229,613 B2* | 1/2016 | Matas | G06T 11/60 |
| 2016/0117071 A1* | 4/2016 | Horn | G06F 16/22 715/768 |

* cited by examiner

*Primary Examiner* — Hadi Akhavannik
(74) *Attorney, Agent, or Firm* — Christopher Mayle; John D. Houvener; Bold IP, PLLC

(57) ABSTRACT

A file management system facilitating a user to organize image content by using visualizations of organizational state of the collections augmented by a graphical interactive workflow leading the user through the process of organization and a method of using file system metadata to retrieve and store the data and organization of the image content.

16 Claims, 8 Drawing Sheets

FILE MANAGEMENT SYSTEM FACILITATING THE ORGANIZATION OF CONTENT BY USING VISUALIZATIONS OF THE ORGANIZATIONAL STATE AUGMENTED BY A CONFIGURABLE WORKFLOW

BACKGROUND OF THE INVENTION

1. Field of the Invention

This invention relates generally to the field of digital content organization. More specifically, the invention relates to a software-based, interactive, configurable workflow to facilitate the selecting and organizing of content and to visually displaying the organizational state of collections.

2. Background

Digital photography has been sweepingly popular with users having digital cameras and smartphones with cameras. Users collect a substantial number of digital photographs in the storage of digital cameras, smartphones, hand held devices, hard disk drives, and the like.

A common way for organizing digital images for viewing and accessing is through use of file system features, such as folder-based systems or more general database-based filing systems to form collections of images, pictures, and other media files. A folder can contain multiple folders within a hierarchical structure. Alternatively, the content of a collection of images can be commonly organized into discrete collections of digital albums, wherein the album maintains a list of references to the content.

Digital cameras typically integrate with computers by using software that allows uploading of photos and videos into file system folders and thereafter creating corresponding digital albums. For example, many digital cameras are supplied in combination with photograph management software, which enables simple loading of new photos into the computer's file system.

There is an array of photo management applications in the market, some of which have utilities, such as star ratings, colors, metadata, and the like, to facilitate users in the task of organizing their photos. These photo management applications can be essentially categorized as either automatic image organizers or manual image organizers. The automatic image organizers are generally software packages that read data presented in digital content and process the data to automatically create an organizational structure.

For example, on the Macintosh (trademark of Apple, Inc.) Computer there is one category of software used to integrate camera, smartphones, and computers together to manage photos. Once new photos are loaded into Mac's ("Mac" is a trademark of Apple, Inc.) file system, its photograph organizer, Photos app, uses so called "Moments", "Collections," and "Years View" to automatically organize the photos and videos by when and where they were taken. The automation of photo organization is efficient and convenient, but it also presents a number of issues, such as that users are left with no control over where the files go onto the file system, no way to organize the photos by quality or sentiment, nor a way to determine if any organization has been attempted for the set of photos.

The user is given little control to manipulate the photos organized in the so-called "Moments", "Year view". While the photos may be viewable under an organized "Year view", "Moment", or particularly named albums, the files are hidden away in folders (file directory structure) where the average users would not even know how to find them. Further, if the user's computer is networked, through internet and cloud, or connected to other devices, such as smartphone, external storage USB, diskette, or other computers, those photos accessible by the software application, such as Apple's Photos app, may not reside on a local file system at all as they may be accessed, manipulated, and referenced directly on the various sources on the network or within the connected devices.

The application software for manually organizing the image content of photos often provides a direct view of the folders present on the user's hard disk. It allows the user only to see the pictures but does not provide automatic organization features. By a manual process working on folder directories, a manual organizer would provide maximum flexibility to a user. Users can create new photo folders, manually select photos, and move or copy them into particular folder directories. The user may also use existing application features to manually organize photo files, such as assigning "star" ratings, or tagging folders with colors. However, to then make use of the ratings or tags, the user must manually adjust filters within the file viewer for individual folders. Additionally the user has no way to determine whether the contents of file system folders has been organized, never organized, or partially organized.

While providing maximum flexibility, manual organizers rely on the user to have her own method to manage their collection. However, actual situations often reveal that most users do not even have a method to organize their photographs. Given the usual substantial volume of photography, such a manual workflow is a time consuming process that is labor intensive and error prone. Thus, users often are left with voluminous photographs scattered, unselected, and unorganized. What is needed is a photo management application that utilizes the provided common tagging mechanism, i.e., ratings, colors, file system metadata, etc., to lead users easily through the process of organizing their collections of photographs.

SUMMARY OF THE INVENTION

The present invention relates to a system that facilitates a user in the organization of image collections by encouraging the addition of descriptive information such as ratings and descriptive tags to images through a serial display of images, and further through the display of visualizations depicting the organizational state of the collections.

Embodiments of the image management system that facilitates a user in the organization of folder-based or database-based image contents into organized collections by tagging includes a content management utility that retrieves the contents of one or a plurality of file folders selected by the user and generates one or a plurality of collections containing images based on attributes selected by the user. The image management system also includes an image review utility coupled with a display utility that together functions as an interactive, configurable workflow for facilitating the user in the organization of the content, one collection at a time, by collecting and processing the users rating for photos while the said display utility shows the preferable image files in a slide presentation during the user rating process. The image management system further includes a tagging utility that is configured to enable the user to view and edit the database data or file system metadata of each file and add one or a plurality of tags resulting from the user's ratings and actions (such as posting an image to Facebook or sending an image by e-mail) on those images into the database data or metadata infrastructure supported by the file system.

Another aspect of the present invention provides a method for facilitating a user in the process of organizing his or her images into preferable sets of collections by automatic filtering based on user-selected attributes.

Another aspect of the present invention is related to a method using system file metadata to retrieve and store application specific data that may be applied to a database or metadata infrastructure of a collection of digital photos.

BRIEF DESCRIPTION OF THE DRAWINGS

For further understanding of the embodiments of the invention relating to both system and method of the operation, reference will be made to the following detailed descriptions of the present invention, accompanied with the following drawings.

DETAILED DESCRIPTION OF THE INVENTION

Figure 1:
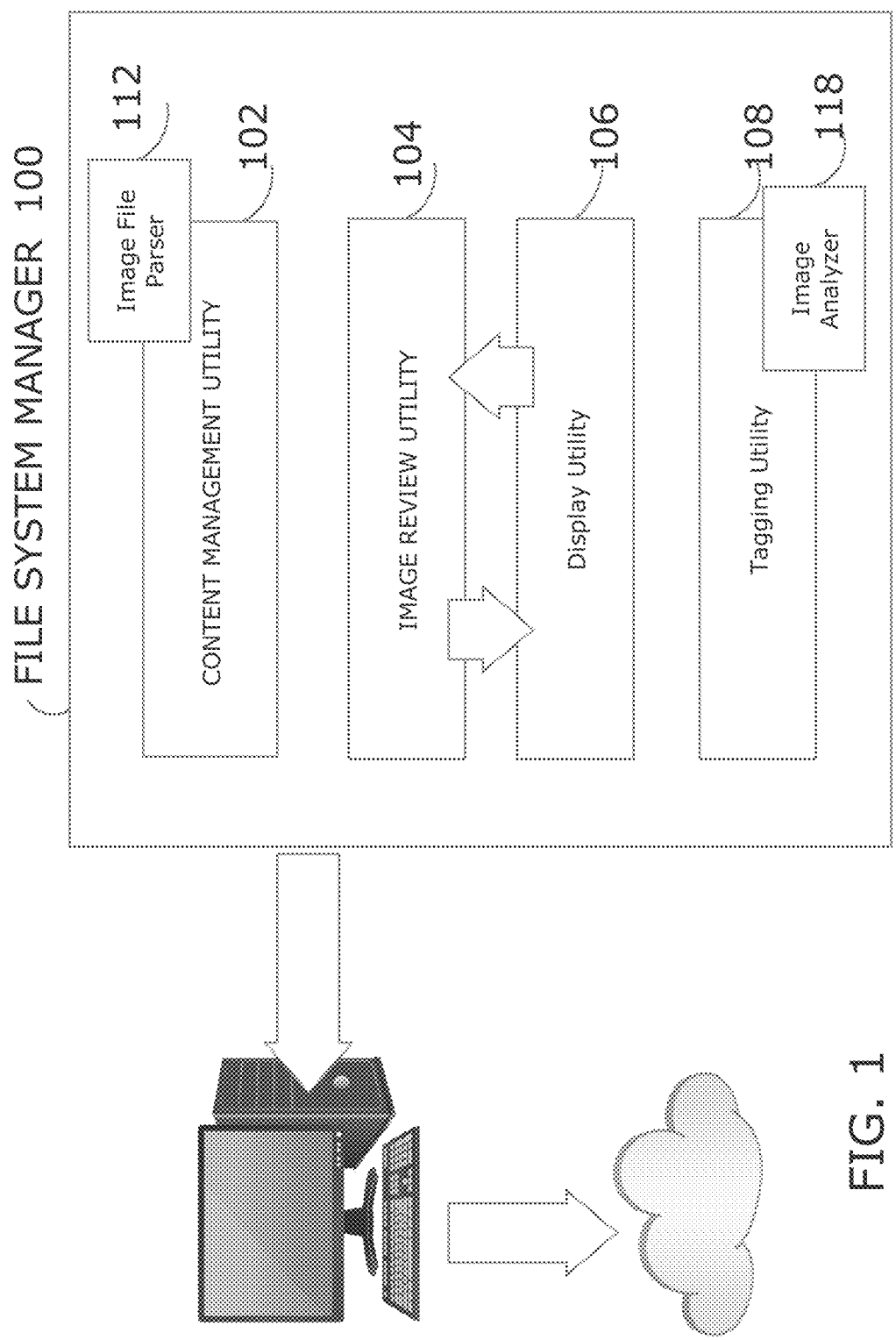
FIG. 1 shows a block diagram illustrating a system for facilitating folder-based or database-based content management into organized collections by visualizations and tagging.

FIG. 1 illustrates a block diagram showing an embodiment of an image management system 100 facilitating organization of digital image content by displaying a visualization of the organizational state of a series of collections and by emphasizing the preferable content.

An illustrative embodiment of the image management system 100 includes a content management utility 102 that allows the user to target one or plurality of file system folders from a folder-based system for the process of organization of the digital images contained therein. The illustrative content management utility 102 can allow the user to browse the file system for navigation and selection of one or more folders within the folder-based file system. There can be more than one file system accessible to the operation system of the host computer. For example, on a Microsoft Windows (trademark of Microsoft Corporation) computer there could be one file system running on the local C: drive, and another on the D: drive. Further, the file system may not be limited to the local drive; major operating systems nowadays, such as Linux (trademark of Linus Torvalds), Android (trademark of Google, Inc), Apple (trademark of Apple, Inc.) operating systems ("OS" or "macOS") such as "OS X", and Windows (trademark of Microsoft Corporation), can operate on the file systems residing both local to the computer and on the network, comprising the local area network, the internet, and the cloud, etc. These database-based and folder-based file systems will be referenced collectively as the "File System". As such, the content management utility 102 will enable the user to select the folders for the organizational workflow from any folders accessible by the aforementioned File System.

To launch the workflow of the invention, a user must select one or multiple folders from the folder-based system as the subject of the organizing process. (The terms "workflow" and "organizing process" are used interchangeably in this disclosure.) There are various ways of selecting the folders, which those skilled in the art can appreciate. For example, one illustrative embodiment of the content management utility 102 can open a dialog box for the user to specify the file path of the targeted file folders. Alternatively, said utility 102 can display the directory tree of the File System and the user can drag and drop the targeted folders to the workflow.

The content management utility 102 further comprises an image file parser 112. After the user has specified one or multiple folders for the workflow, the content management utility 102 traverses the file directories of the selected folders, and in each folder, the image file parser 112 will scan for image files to parse. The File System location of the parsed image file along with data or metadata of each parsed image file is entered into an all-inclusive list of image files known to the content management utility 102, said data or metadata including, but not limited to, image name, capture date, user assigned tags, rating tags, descriptive tags, information from the image header, etc.

Having generated the all-inclusive list of known image files, the content management utility 102 will then sort the image files into a set of one or plurality of collections ("Collections") based on a user selected (and stored) attribute, or combination thereof, such as date or assigned tag or geographic location where the image was captured. The number of Collections in the set will vary with the number of unique values for the selected attribute found in the all-inclusive list. Each member of a Collection will have the same selected attribute as the other members in that Collection. For example, if the user were to select "years" as the attribute defining Collections, there would be a set of Collections, one Collection for each year in which at least one image in the all-inclusive list was captured, each Collection containing all image files captured within that year. The user could further refine the definition of the Collections by combining the attribute of the year-taken with the month-taken, resulting in Collections for each month-and-year combination found in the all-inclusive list of images.

In one illustrative embodiment, the image file parser 112 loads the data or metadata stored in the file header of each image file and parses any existing File System tags which are defined by the host OS running the file systems, including OS X or Windows. For example, the image file parser 112 enables the parsing of data in image files which come in various header formats, such as EXIF, IPTC, TIFF, JPEG, BMP, GIF and the like. The process of parsing the headers of the images does not require rendering the image itself, and thus takes a fraction of the typical import process time because the image data of the image itself is never decoded.

The content management utility 102 enables additional techniques for generating the Collections of image files, for example, but not limited to, by manually hand-picking images from existing folders, or by dynamically generating a Collection by selecting one or more attributes of image metadata such as the model of camera, the exposure or the f-stop used by the camera, or any other information available in the file header, image file owner, location, or any other information available in the file system metadata of the image file of a given OS such as OS X or Windows.

Alternatively, the process of generating the Collections can operate automatically according to Collection definitions predefined by the application software, and previously selected by the user for default use by the application. In one illustrative embodiment, the predefined Collection could be based on file system folders in which the image files reside.

Another embodiment allows images to be stored in a separate database rather than the file system. This would allow the Collection to be stored and described as general data in an additional database for more organizational options. Similarly, metadata and tags can also be stored in a separate database outside of the normal file system.

Tagging of image files based on metadata enables organization based on a variety of properties and condition, for example, organization based on date and time of image creation, filename, and other information encoded in the image header. In an illustrative embodiment, the Collections can be defined using file system wide tags as the defining attribute. In general, the file system wide tags can be manually created by the user or assigned to the file system by the host operating system.

In an illustrative embodiment, the tagging utility 108 enables new techniques to generate additional file system wide tags for the workflow of organizing image files. For example, the tagging utility 108 can create additional file system wide tags such as the geographic location (e.g. Yosemite national park), street address, city, state, etc., by analyzing the GPS metadata stored in the header of the photos. Alternatively, the tagging utility 108 further comprises an image analyzer 118 which can process the image data, analyzing the photographs, identifying the characteristics of the photographs, such as, for instance, a sunset, a landscape, a building, a person or persons, even a person's identity. The tagging utility 108 may create more tags for organization based on the result of image analysis.

Most image management applications display all the image files in a single browsing panel. Window-based file browsers generally display individual photos in thumbnails with various selectable sizes (such as extra large icons, large icons, medium icons, or small icons). The same window-based file browsers can also arrange the display of multiple image files as a list, a list with details, or in a tile fashion. A user, however, may not intuitively tell whether the Collection of photographs is organized or not simply by looking at the displayed thumbnails in the file browser. The unorganized status of a Collection of images makes it harder for users to locate good content, or determine what is left to be organized.

In an illustrative embodiment, the file management system 100 further comprises an image review utility 104, which is coupled with a display utility 106 and together functions as an interactive workflow, visually queuing one or a plurality of the "Collections" of image files which are generated by the aforementioned content management utility 102. In one illustrative embodiment, the display utility 106 displays a list of the Collections in a stack, while each row of the stack represents one Collection. For the visual effect, each row of the stack may be shaped like a drawer-like container, while a user may click into one container to browse the Collection's content therein. As the content management utility 102 may generate as few as zero or a large number of Collections which may be too numerous to fit onto one single view screen, a user can scroll down the scrollbar to view the Collections stacked at the bottom.

When Collections are generated by the content management utility 102, each Collection possesses an "Organizational State." Example modes of the Organizational State can be: "Organized", "Unorganized", and "Partly Organized". Organizational states can be further characterized with other modes for user's interest. (Refer to paragraph for definition of the Organizational States.)

In its display panel, the review utility 104 displays one or multiple Collections as stacked containers in different ways according to each Collection's Organizational State in such way that a user may, at a glance, easily discern which container has gone through the organizing process, and which has not. In the illustrative embodiment shown in FIG. 3, the image review utility 104 uses color to indicate the Organizational State of the presented Collections. For example, an organized Collection is presented with a green header on the left of the container (a slice of the stack), while the container of an unorganized Collection is labeled with blue header. The container header of a work-in-progress partly organized Collection can be highlighted in orange. In the tool settings, users can configure the color indicators to their like.

Alternatively, a Collection whose Organizational State is Organized may indicate such by displaying a single image or photograph covering the entire container, while an Unorganized or Partially Organized Collection may be indicated by displaying a plurality of fractional photos or content images. In an illustrated FIG. 3, the containers of organized Collections are presented with a single image (the single image file may be user selected, or be the highest rated image file in the Collection) and labeled with a green header, while the unorganized Collections are indicated by a blue header and a plurality of mosaic-like fractional photos. In this figure, all four containers are drawn at the same size. However, they can be drawn at different sizes, for example, unorganized containers are made smaller or more than one unorganized containers are made to appear in one row of the stack. There would be numerous variations or modifications that can be used by the persons skilled in the art to present the Collections and their Organizational State.

In an alternative embodiment, the image review utility 104 can display only the unorganized Collections by the user's direction. Alternatively, the organized containers and unorganized containers can be displayed in separate view panels, while the user can switch the view by toggling between the two. With a dialog box, the user may even prompt the system to bring up a random container which has not been organized.

Figure 8:
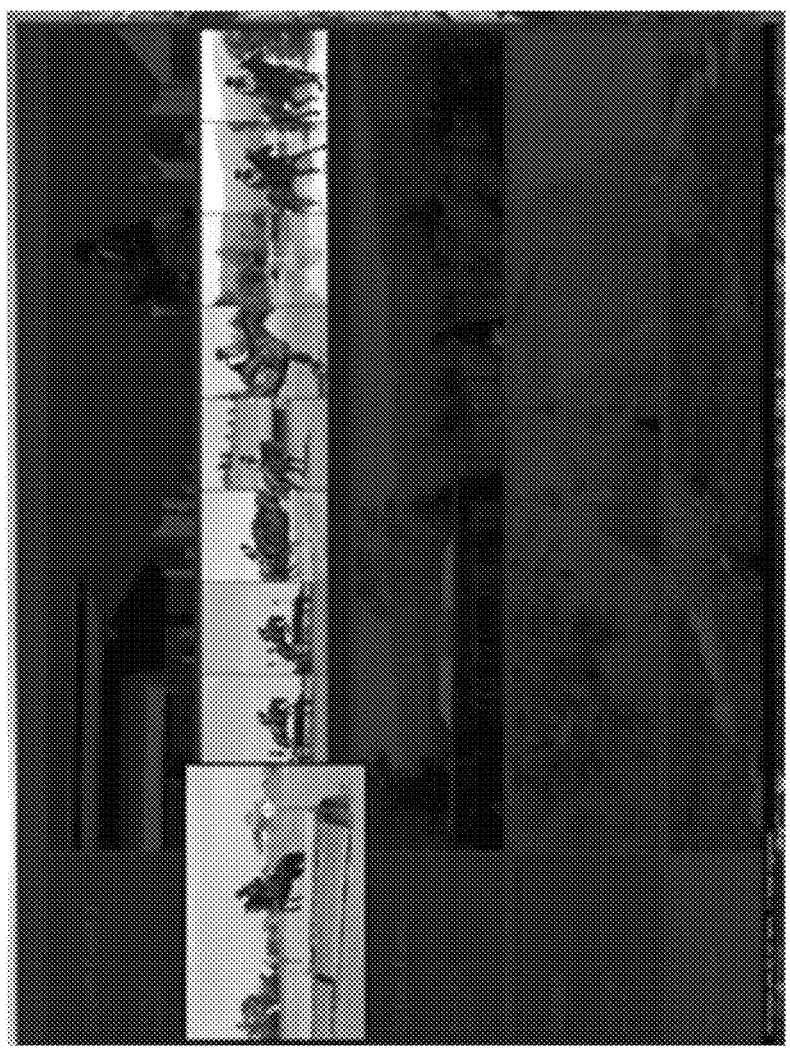
FIG. 8 shows an illustrated embodiment of the display of a preview mode.

In another alternative embodiment shown in FIG. 8, A "Preview" mode is provided for users. By user interaction on a particular container, the display will present the content photos therein on a streamline row like a rolling film, which may be of indefinite length depending on the number of photos in the Collection. In an example preview mode, a user is able to scroll left and right while the photos can be in turn enlarged when the user hover over them. The streamline row can be displayed in different ways based on the Organizational State of the container, the predominate file type therein, and other metadata, etc. Additional views may be defined, such as panoramic views, moving video images, icons representing file contents, etc. The display can be further configured by the user, for example, only display the photos with preferable rating in the preview mode.

As the display of the image review distinctively presents the Collections with their respective Organizational State, a user can easily discern the organizational status of a particular Collection without further clicking into the content therein. More pertinently, when a user revisits Collections in the Organized State, they are not flooded with the content that they have rejected or passed over. The rejected or passed over content remains available should the user like to retrieve or promote the images to the preferred state, but by default they see only the images that meet certain criteria (i.e. rated two stars or better).

Embodiments of the image review utility 104 are configured to operate by a method or workflow (See FIG. 2) for facilitating a user through the process of organizing the selected image content. A user starts the organizing process of the present invention by selecting a particular Collection. Various ways can be available for a user to specify a Collection for the organization process. For example, a user can double click the container displayed by the image review utility 104, or a user can enter a container name through a dialog box. Alternatively, a user may start the organizing process with a Collection of higher priority, preset in the system's configuration. The image review utility 104 further comprises a utility panel for the user to configure the modes and settings of the organizing process. (See FIG. 6).

Figure 2:
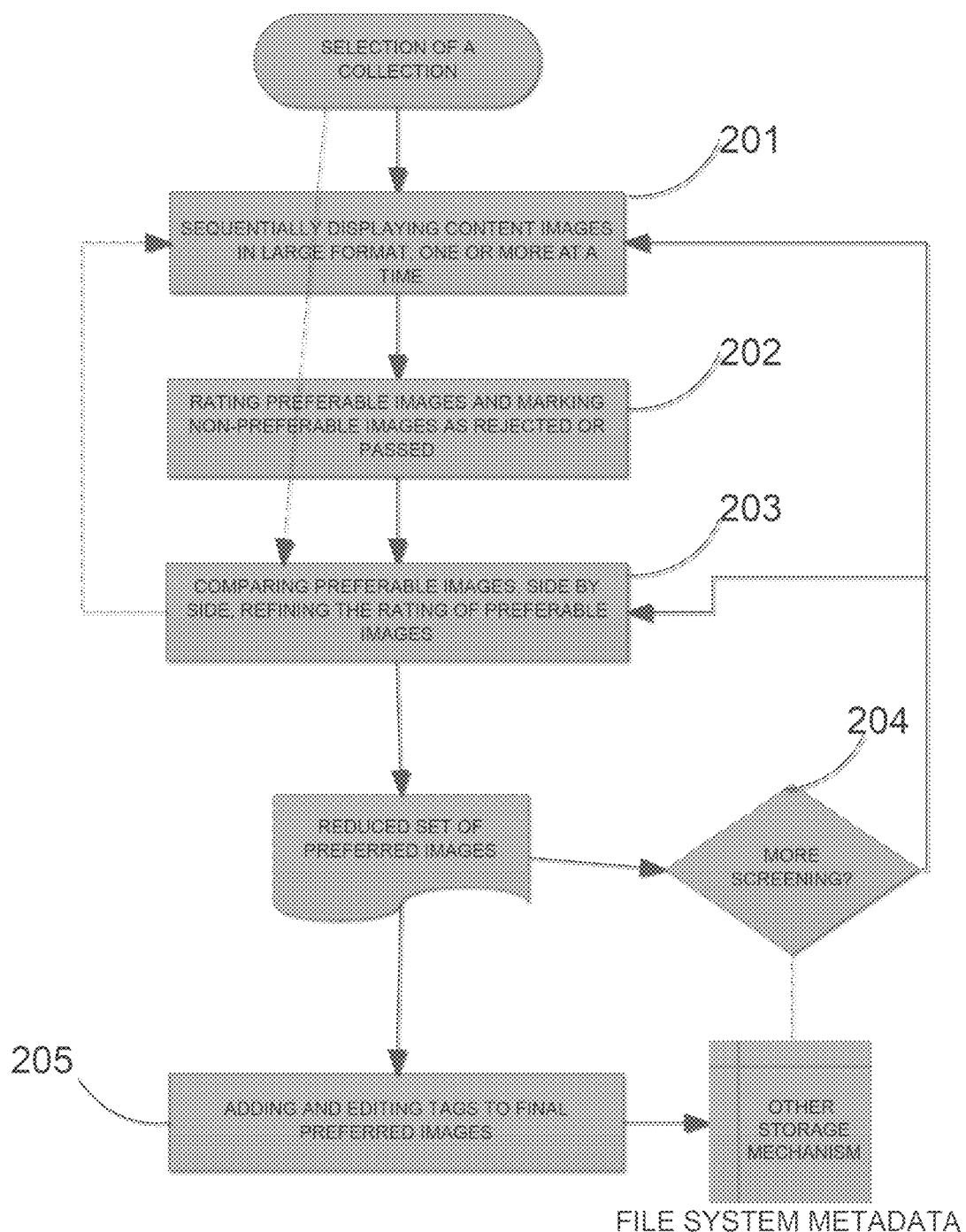
FIG. 2 shows an example method illustrating a configurable workflow for leading a user through the process of organizing their photos by rating.

FIG. 2 flowchart presents an illustrative embodiment of a workflow 200 which, coupled with the aforementioned display utility 106, facilitates a user step by step through the process of organizing their photos. One method of the workflow disclosed in the present invention comprises the following configurable steps: sequentially displaying 201 each image file, e.g. a photograph, in the Collection in a large format, one-at-a-time, slideshow fashion; 202 enabling the user to rate each photo at the time it is sequentially displayed by applying one or more rating schemes to obtain the users assessment of the photo, wherein the preferred images are provided with a preferable rating (e.g. a positive rating) and non-preferred photos a negative rating; 203 sequentially displaying a reduced set of preferred photos for user to compare one or more preferred photos, side by side, with another one or more preferred photos and applying one or multiple rating schemes to further increase or decrease the positive ratings and reassign ratings or re-rate as needed. Ratings schemes can be based on different rating scales, such as a "−1, 0, +1" scale, a "1-10" rating scale, or similar rating scales. Rating schemes and rating scales are used interchangeably throughout the disclosure.

Figure 6:
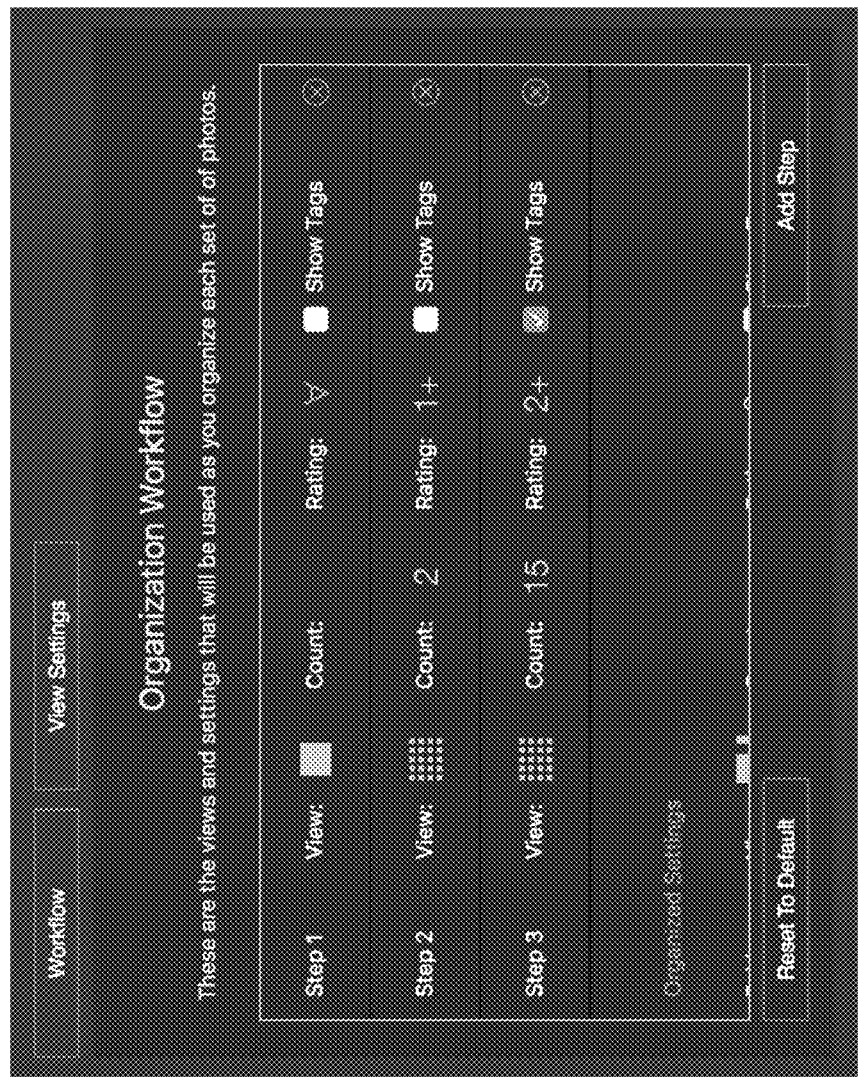
FIG. 6 shows an illustrated embodiment of the configuration panel to configure a user interactive workflow.
Figure 7:
FIG. 7 shows an illustrated display for side by side comparison of two photos.

The illustrated embodiment of the 200 workflow shown in the FIG. 2 can be understood as a process of screening, where the step 201 is to wade through a photo stream of the Collection, followed by step 202 indicating the preferred photos by an rating scheme, for example, providing a +1 rating, and filtering out any undesired photos by providing them with a −1 rating, or by choosing not to rate them (e.g. keeping the original rating with default 0 value). The step 203 provides a side-by-side display of a small set of two or more preferred photos at a time to allow photo perlustration both individually and with relation to one another. A display of two photos for side-by-side examination is shown in FIG. 7 for illustration purposes. There can be two or more photos displayed at a time for the close-up comparison; the user can set up or change the number of photos to be displayed at time for step 203 in a configuration panel, an example embodiment of which is shown in FIG. 6.

In embodiments of the workflow, the display utility 106 displays only the set of preferred photos, the number of which are reduced by each iteration of the screening step with an increase in the minimum rating for display. To facilitate the user step by step through the organizing process, the workflow only displays the photos which are still candidates for the refining process, while the images with less preferred ratings would be filtered out from the display for next screening step. However, they can be still accessible by the system (Refer to the paragraph of [0055] and FIG. 4 for an illustrated display of preferred photos and demoted view of the rejected).

While the screening of steps 201 through 203 will result in a reduced set of photos with a higher preferred rating, a user can further the screening by repeating any of the aforementioned steps, or combination thereof. In other words, a user can conduct multiple iterations of screening by displaying a configurable number of preferred photos at a time. The number of iterations of the aforementioned steps, the minimum preferable rating indicating a preferred image, and the number of preferred photos to be displayed at a time for comparison can be set on default workflow or user configuration. Through the configurable screening process a user may refine the preferred photos to a small set of top rated selection.

The example embodiment of an illustrated workflow shown in FIG. 2 comprises an additional step 204 comparing in an iteration one or more preferred photos with another one or more preferred photos and applying one or multiple rating schemes, to further refine the rating of the images. Alternatively, the user can configure the workflow to comprise additional step 204 (similar to the steps 201 and 202) displaying each preferred photo of the reduced set in large format, one at a time, and applying one or more rating schemes to increase or decrease its respective rating.

All embodiments of the illustrated workflow 200 shown in the FIG. 2 further comprise the step 205 adding one or more tags to the resulted reduced set of preferred photos, while the less preferred photos have been filtered out by having failed to receive a preferred rating during the screening process. In another embodiment, an optional step 206 may be added for a user to review the resulted reduced set of preferred photos in sequence, enabling the user to alter the tags of the resulting preferred images.

There is more than one rating scheme that the user can exercise on the aforementioned operation for determining the user assessment of the photo in the step 202, 203, and 204 of FIG. 2, e.g., a numeric rating, a color scheme to indicate the preference, or applying a user specific tag to specify his/her preference. Further, there are variations to the exampled rating schemes that can be implemented by those skilled in the art. In the aforementioned screening steps 201 through 204, again, the user has the ability to increase, decrease, or "pass" leaving the same rating intact on one or more images when compared side-by-side during the process of further review.

For example, a numeric rating is not just confined to giving a numeric rating, instead, it could be just increasing or decreasing the existing rating or reassigning ratings or re-rating existing ratings during the screening steps 201 through 204. The user may also "pass" by leaving the same rating unchanged on one or more photos under the comparison. In one example embodiment, the preferable state is defined as "1" which indicates user's preference to keep. There is an opposite state of rejection which is marked as "−1" rating. There is also effectively a "passed" state which is given "0" rating. In the example embodiment, when further refining the rating of the photos, the minimum rating of the photos to be displayed may be configured such that only images of a +1 rating be displayed for comparison.

The workflow 200 disclosed in the present invention has been, at times, illustrated with the organization of photographs. However, the utilization of the organizing process is not limited to photographs only. It is apparent to those skilled in the art that the description uses the terms "photo", "photograph", and "image file" interchangeably.

The Organizational State of a Collection is defined by whether the image files contained therein have been previously screened or rated, where the screening and rating results are tracked and stored using file system tags. In an illustrative embodiment, the application parses the metadata of each image file of a Collection and determine the Organizational State of the Collection by the collective rating data of the image files thereof. In the illustrative embodiment, a Collection for which all contained image files have been rated (or passed) is defined as "Organized". A Collection in which none of the contained image files have been rated is defined as "Unorganized". A Collection in which at least one image file has been rated and at least one image file has not been rated is defined as "Partially Organized". In an alternative embodiment, the Organizational State of a Collection may be determined by whether the images in the Collection have been previously screened, even though a rating may have not been provided by the user during the previous screening. In the illustrative embodiment, a Collection for which all image files have been screened is "Organized", a Collection in which none of the image files have been screened is "Unorganized", and a Collection in which at least one image file has been screened and at least one image file has not been screened is "Partially Organized". Variations, additions, and modifications of the definition of the Organizational States can be appreciated by the persons skilled in the art.

FIG. 6 presents an embodiment of a configuration panel for the organizing process. The modes, settings and the number of the iteration of the steps, e.g., the side-by-side comparison in step 203, are predetermined by a default. The user, however, has flexibility to change modes, setting, and the number of iteration of a particular step through the configuration panel. Optionally, the configuration could allow the user to set or change a predetermined range, e.g., 10 to 25 percent, suggesting the average number of the preferable photos out of all subject photos. A warning indicator can alarm the user at the last step if the percentile of preferable photos is out of range.

Figure 3:
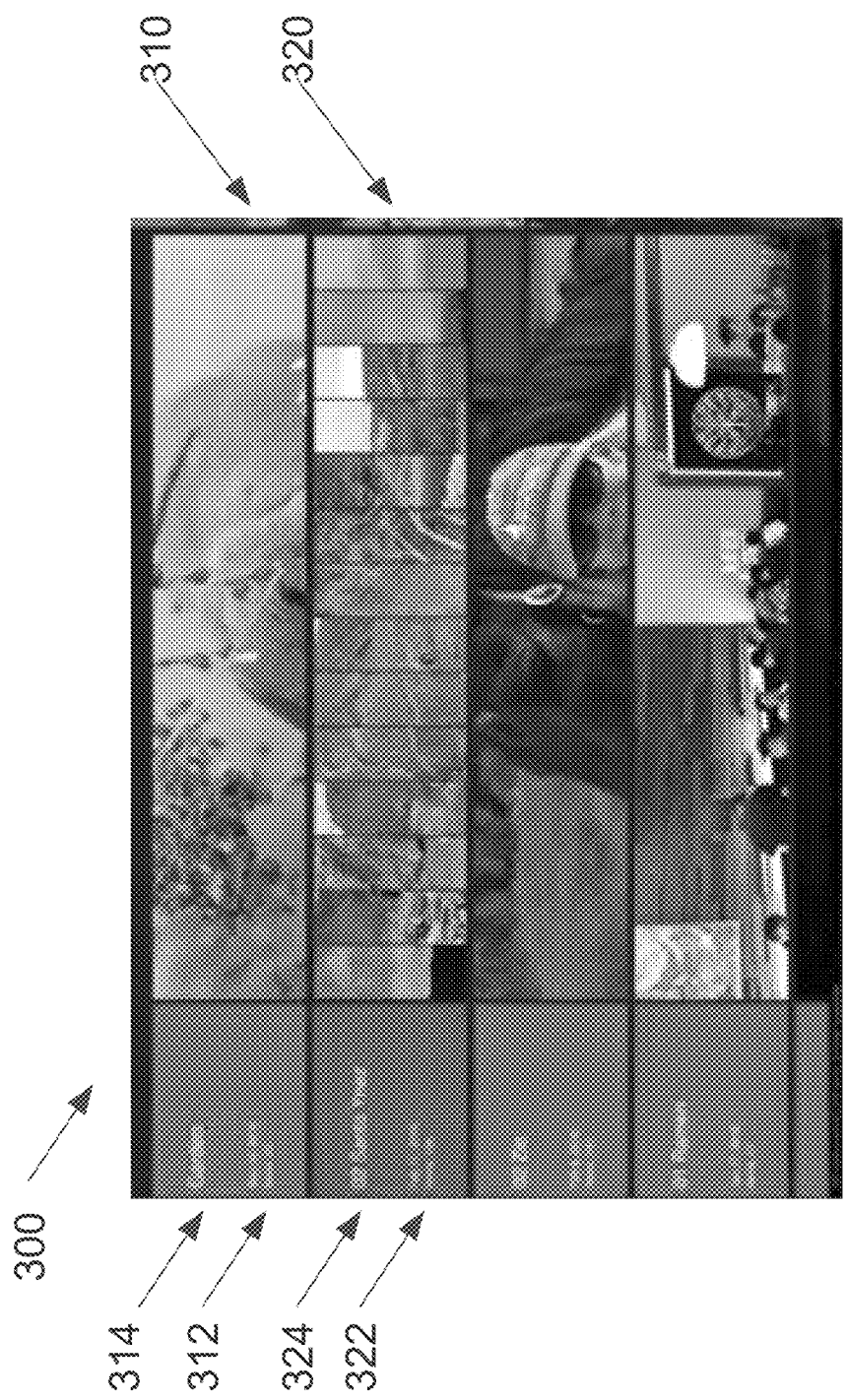
FIG. 3 illustrates a stack presentation of the collections of photographs.

FIG. 3 shows an illustrative embodiment of image review utility 300 that displays a stack of Collections. In the diagram, a container 310 of first Collection at the top of stack is displayed with a single representative photo that is indicative of the organized state, and a container 320 of a second Collection is presented with a plurality of fractional photos which are sampled into mosaic-like presentation indicative of its unorganized state.

In this illustrated embodiment, the headers 330 of the stacked containers are located at the left side of each container row. The colors of the headers 330 indicate respective organizational state of each container, e.g. the green color is labeled for organized container, while the blue is indicative of the unorganized state of the container. The header 330 may further display some metadata, such as the time and date stamp 312 that indicates the latest modification of the Collection, and a moniker 314 that is entered by the content management utility 104 which generates the Collection. Likewise, the header 330 of the second container 320 may display a time and date stamp 322 and a second moniker 324.

Figure 4:
FIG. 4 illustrates the display of the preferable photographs for comparison, along with a demoted view of the rejected photographs.

FIG. 4 shows an illustrative embodiment of the display of the review utility 104, wherein the preferred (e.g. positively rated) photos 400 meeting a certain minimum rating criteria (e.g., +1 rating) are displayed sequentially in large format, one at a time, slideshow fashion. Alternatively, the preferable photos can be batched into sets of a small count (two or more determined by the configuration) for a relative comparison, wherein the sets of photos are displayed sequentially in a photo size collectively fitting to the display area. Another photo icon 410 at the bottom of the display is shown fitting to the display area. Another photo icon 410 at the bottom of the display panel represents the link of lesser rated photos which are passed over or rejected during previous screening steps. The set of lesser rated images 410 may be expanded, magnified and processed using the organizing steps and promoted to the preferable status.

Figure 5:
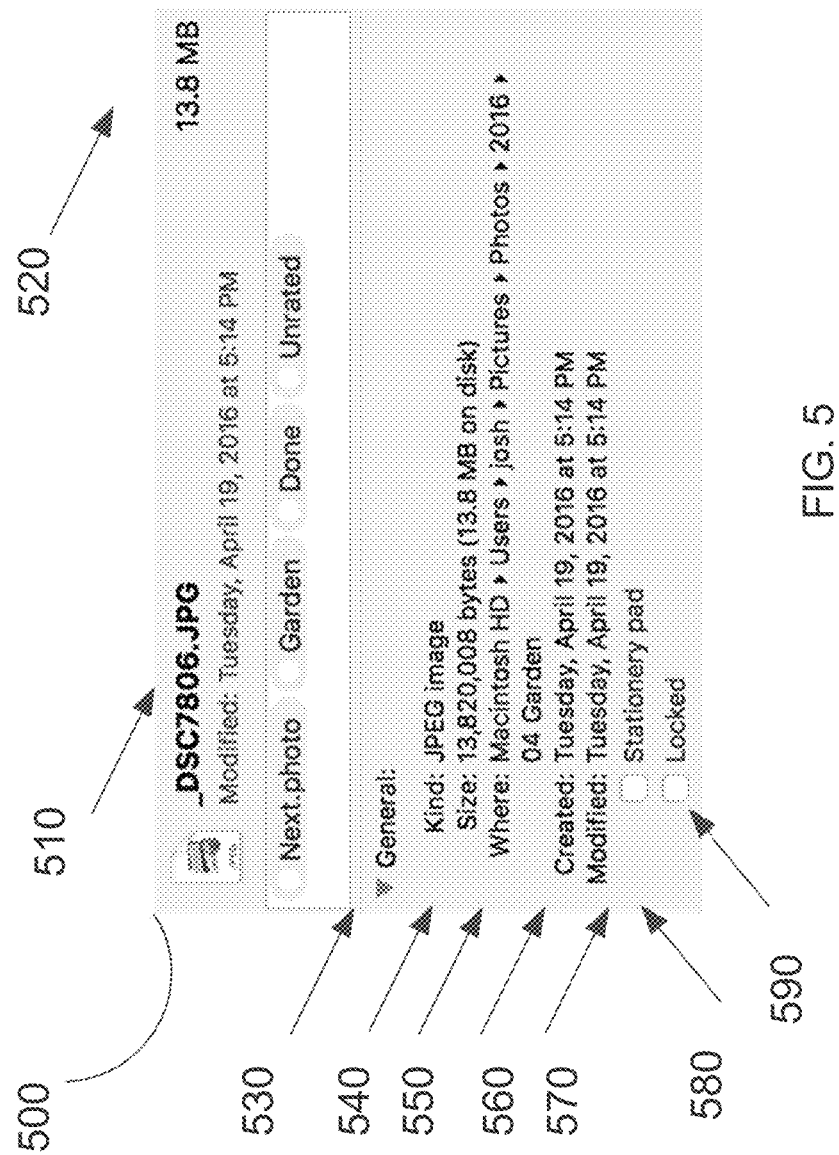
FIG. 5 illustrates a metadata infrastructure of a single image file.

An exemplary metadata infrastructure 500 of an image file is presented in FIG. 5. The metadata infrastructure 500 may include, but is not limited to, a metadata moniker 510, a metadata size moniker 520, a kind of metadata 530, a metadata origination 540, a creation time stamp 550, a modification time stamp 560, a plurality of rating boxes 570, a stationery pad button 580, and a locked button 590.

Modern computer operating systems, i.e., such as Apple's iOS, Linux OS, and Microsoft's Windows, support file systems to manage the files accessible by the computer. A typical file system can store data or metadata on a per file basis, either within a separate database or within the file system's metadata infrastructure. File property dialog boxes, for example in Windows and Apple OS, display information about the files, such as the name of the author and the date that the file was last modified. Among the many properties associated with the files are tags which allows users to add arbitrary textual information to their files. The tags may contain words or phrases that allow users to organize and find files quickly when the user searches and filters using file properties. For example, users can narrow the view of files in the image folder to just those pictures by a particular author or those that contain certain tags.

User defined tags can be manually created as additional file properties. The typical file system can integrate arbitrary user defined "tags" on a file system wide metadata. The present invention adopts such file system wide metadata infrastructure to store a version of application specific tags for a collection of images generated by the disclosed system. In additional to user defined tags, such application specific tags include, for example, the image format or the user ratings to a particular photo. The application specific tags can be based on camera metadata like the make, model, serial number, f-stop, and etc. Tags can be automatically generated by the disclosed system based on the GPS information of the place, street address, the city, state, etc. Further, the disclosed system can automatically generate additional tags to characterize the photo by an image analysis utility, identifying the subject of the photo, such as a person, person's face, a building, cars, trees a scene of sunset, etc.

Further "action based" tags can be automatically inserted based on user actions with the image file. In an illustrative embodiment, if the user sends an image file by e-mail, or if the user shares an image file using Facebook, associated action tags can be added to the image file. At a later time the user may select, for instance, all image files that have been shared on Facebook.

By using the file system supported metadata, application software added tags are not confined to the application itself. Instead, they are added to file system wide metadata, and thereby are carried with the image file across the system and over the cloud by the aforementioned File System.

Another benefit of the adopted file system wide database or metadata infrastructure by the disclosed system is that the data is not locked away in the header (such as EXIF) of the image file or limited to the application use only. Users can use their tags created in the disclosed system in other file browsers, such as the Finder and Open Panel for Apple computer, or the File Explorer for MS Window, to retrieve and organize their image files, which are ultimately resided in the document folders of the File System.

The overall method steps may include using the metadata infrastructure 500 to document what the photo is, what rating the user gives to the photo, the time and place that the photo taken, and the like.

While the present disclosure describes various embodiments, these embodiments are to be understood as illustrative and do not limit the claim scope. It is evident that many variations, alternatives, modifications and additions of the described embodiments will be apparent to those skilled in the art. The process parameters, iterations and dimensions, which are given in this disclosure by way of example and can be varied to achieve desired status and result, are within the scope of the claims. Accordingly, the illustrative embodiments of the invention, as set forth above, are intended to be illustrative, not limiting the invention. Various changes may be made without departing from the spirit and scope of the following claims.

What is claimed is:

1. An image management system that facilitates a user to process content into organized collections by tagging, comprising:
    a content management utility configured to recognize and retrieve images from a database and generate one or more collections according to a user's directions;
    an image review utility coupled with a display utility to function as an interactive, configurable workflow, wherein
        the images from one of the collections are displayed and evaluated by the user with a preferred subset of the images receiving a preferable rating,
        the preferred subset of the images are displayed and further evaluated, and
        the collection, wherein all the images have been evaluated, is marked as an organized collection and the collections not marked as an organized collection are marked as unorganized collections; and
    a tagging utility configured to enable the user to view and edit database data of each image, and add one or more tags generated by user input thereto;
    wherein the image review utility recognizes the images belonging to the organized collections, and the display utility represents the organized collections using one graphical method and represents the unorganized collections with a different graphical method;
    wherein the display utility displays a single image to represent the organized collections, and a plurality of fractional photos to represent the unorganized collections.

2. The image management system of claim 1 wherein the database is a folder-based file system.

3. The image management system of claim 1 wherein the database data of each image are file system metadata.

4. The image management system of claim 1 wherein each of the images further comprises a file header and image data, and the content management utility parses the file header of each image without decoding the image data of the image.

5. The image management system of claim 1 wherein the content management utility comprises automatic image organizing software packages that automatically create an organizational structure based on data presented in digital content.

6. The image management system of claim 1 further including an image analyzer capable of processing image data of the images and identifying photograph characteristics.

7. The image management system of claim 3 wherein the file system metadata consists of descriptive tags.

8. The image management system of claim 1 wherein the interactive, configurable workflow proceeds recursively until a pre-defined stopping point is reached.

9. The image management system of claim 1 wherein tags are added to the small set of preferably rated images based on the preferable rating or other user input.

10. An image management system that facilitates a user to process content from database filing systems into organized collections by tagging, comprising:
    a content management utility configured to recognize and retrieve image files from folder-based content and generate one or more collections according to a user's directions, wherein the content management utility parses the file header of each image file without decoding the image data of the image file;
    an image review utility coupled with a display utility which facilitates user organization of the content of one or more collections using a user input rating, wherein the image review utility facilitates an organizational workflow wherein
        one or more images from one of the collections are displayed at the same time, the images are evaluated with preferred images receiving a preferable rating,
        one or more remaining images from the collection are displayed and evaluated with preferred images receiving a preferable rating until all the images in the collection have been evaluated and the collection wherein all the images have been evaluated is marked as an organized collection,
        a smaller set of preferably rated images are displayed and further evaluated and this proceeds repeatedly until a user defined stopping point is reached,
        wherein the image review utility displays a single image of the organized collection to represent said organized collection, and a plurality of fractional photos to represent the collections not marked as an organized collection;
    a tagging utility configured to enable the user to view and edit the metadata tag of each file, and add one or a plurality of metadata tags generated by user's input thereto, wherein the tagging utility adds metadata tags preferably rated images based on the preferable rating or other user input; and
    an image analyzer capable of processing the image data and identifying photograph characteristics.

11. The image management system of claim 10 wherein the metadata tags consist of descriptive tags.

12. The image management system of claim 10 wherein the image review utility recognizes image files belonging to organized collections, the display utility represents the organized collections using one graphical method and represents the collections that are not organized collections with a different graphical method.

13. The image management system of claim 10 wherein the content management utility comprises automatic image organizing software packages that automatically create an organizational structure based on data presented in digital content.

14. The image management system of claim 10 wherein the content management utility parses the file header of each image file without decoding the image data of the image.

15. The image management system of claim 10 wherein the identifying photograph characteristics comprise scenery such as a sunset, a landscape, and a building.

16. The image management system of claim 10 wherein the identifying photograph characteristics comprise one or more persons.

* * * * *